(12) United States Patent
Beauregard et al.

(10) Patent No.: US 12,034,296 B2
(45) Date of Patent: Jul. 9, 2024

(54) POWER SURGE PROTECTOR

(71) Applicant: 10551554 CANADA INC., Granby (CA)

(72) Inventors: Martial Beauregard, Granby (CA); Maxim Beauregard, Bromont (CA)

(*) Notice: Subject to any disclaimer, the term of this patent is extended or adjusted under 35 U.S.C. 154(b) by 181 days.

(21) Appl. No.: 17/820,283

(22) Filed: Aug. 17, 2022

(65) Prior Publication Data

US 2023/0046251 A1 Feb. 16, 2023

Related U.S. Application Data

(63) Continuation-in-part of application No. PCT/CA2021/050252, filed on Feb. 26, 2021.

(60) Provisional application No. 62/981,657, filed on Feb. 26, 2020.

(51) Int. Cl.
*H02H 9/04* (2006.01)

(52) U.S. Cl.
CPC ..................... *H02H 9/04* (2013.01)

(58) Field of Classification Search
CPC . H02H 9/04; H02H 9/041; H01C 7/12; H01C 1/02; H01C 1/028; H01C 7/102; H01C 7/126
USPC ........................................................ 361/118
See application file for complete search history.

(56) References Cited

U.S. PATENT DOCUMENTS

| | | | |
|---|---|---|---|
| 3,878,423 A | 4/1975 | Hill et al. | |
| 4,240,124 A | 12/1980 | Westrom | |
| 4,282,557 A | 8/1981 | Stetson | |
| 4,686,603 A | 8/1987 | Mosele | |
| 5,128,824 A | 7/1992 | Yaworski et al. | |
| 5,363,266 A | 11/1994 | Wiseman et al. | |
| 5,488,534 A | 1/1996 | Rau et al. | |
| 5,502,612 A | 3/1996 | Osterhout et al. | |
| 5,596,308 A | 1/1997 | Bock | |
| 5,825,598 A | 10/1998 | Dickens et al. | |

(Continued)

FOREIGN PATENT DOCUMENTS

| | | |
|---|---|---|
| CH | 659909 A5 | 2/1987 |
| CN | 203607840 U | 5/2014 |

(Continued)

OTHER PUBLICATIONS

Corresponding International Application No. PCT/CA2021/050252 International Search Report dated Jun. 7, 2021.

(Continued)

*Primary Examiner* — Dharti H Patel
(74) *Attorney, Agent, or Firm* — Anglehart et al.

(57) ABSTRACT

The present disclosure provides a surge protector device comprising an electrical connector for connecting said surge protector device to a current network, at least one metal oxide varistor (MOV) connected to said electrical connector; and a first containment unit at least partially filled with a medium having dielectric, heat resistance and elastic properties embedding said at least one MOV unit within said first containment unit, said containment unit having at least one opening; wherein upon failure of said at least one MOV unit due to a surge in said current network said opening allows expansion gases created by said at least one MOV unit to be discharged from said first containment unit. In another embodiment, the surge protector connects directing to an electrical board and discharges expansion gases therein.

20 Claims, 15 Drawing Sheets

(56) References Cited

U.S. PATENT DOCUMENTS

| | | |
|---|---|---|
| 5,844,761 A | 12/1998 | Place, IV |
| 5,953,193 A | 9/1999 | Ryan |
| 5,986,870 A * | 11/1999 | Kapp ..................... H01C 1/028 361/131 |
| 6,327,129 B1 | 12/2001 | Dertel et al. |
| 6,879,478 B2 | 4/2005 | Mendoza et al. |
| 9,025,297 B2 | 5/2015 | Fujisawa et al. |
| 9,437,354 B2 | 9/2016 | Vélez et al. |
| 2002/0071233 A1 | 6/2002 | Bock et al. |
| 2005/0122655 A1 | 6/2005 | Hotchkiss et al. |
| 2005/0243495 A1 | 11/2005 | Ramarge et al. |
| 2006/0257672 A1 | 11/2006 | Horkosh et al. |
| 2007/0159756 A1 | 7/2007 | Moffatt |
| 2007/0290786 A1 | 12/2007 | Chou et al. |
| 2009/0323244 A1 | 12/2009 | Hoopes |
| 2010/0033885 A1 | 2/2010 | Hotchkiss et al. |
| 2016/0055945 A1 | 2/2016 | Tseng et al. |
| 2018/0062374 A1 * | 3/2018 | Yang .................... H01C 1/08 |
| 2019/0207386 A1 | 7/2019 | Wang |

FOREIGN PATENT DOCUMENTS

| | | |
|---|---|---|
| CN | 206004605 U | 3/2017 |
| CN | 207835050 U | 9/2018 |
| EP | 0335480 A2 | 10/1989 |
| EP | 2449570 A1 | 1/2011 |
| GB | 1430079 A | 3/1976 |

OTHER PUBLICATIONS

Corresponding International Application No. PCT/CA2021/050252 Written Opinion dated Jun. 7, 2021.

Corresponding International Application No. PCT/CA2021/050252 Search Strategy dated Jun. 7, 2021.

Corresponding European patent No. 21761251.4 extended European search report dated Apr. 16, 2024.

* cited by examiner

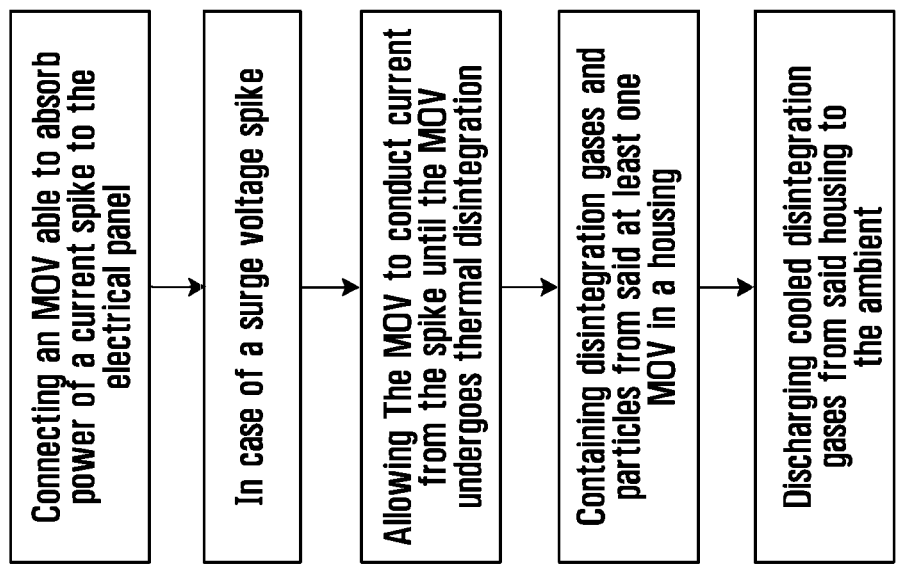

POWER SURGE PROTECTOR

This application is a continuation-in-part application of International PCT application No. PCT/CA2021/050252 filed Feb. 26, 2021, designating the United States, that claims priority of U.S. provisional patent application Ser. No. 62/981,657 filed Feb. 26, 2020, the contents of which are hereby incorporated by reference.

TECHNICAL FIELD

The present patent application relates generally to electrical wiring equipment and more particularly to power surge protectors.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted being prior art by inclusion in this section.

Power surges can damage or destroy home appliances or reduce the lifespan of electronics, and in the worst-case scenario, start a house fire.

They may occur for several reasons, for example, high-power electrical devices can create a spike in the electrical current when they are switched on or when their motors start or stop. Refrigerators, air conditioners and even space heaters can cause a power surge strong enough to damage electrical systems. Lightning strikes are another common cause of power surges.

A lightning strike does not have to occur near a location to result in a spike in the electrical current. In fact, striking close to a power line can cause a spike anywhere along the line. A single strike can cause a spike strong enough to burn out a computer monitor, router and even televisions connected to the line.

A voltage spike is a transient event, typically lasting 1 to 30 microseconds, that may reach over 1,000 volts. Lightning that hits a power line can give many thousands, sometimes 100,000 or more volts. A motor when switched off can generate a spike of 1,000 or more volts. Spikes can degrade wiring insulation and destroy electronic devices like battery chargers, modems and TVs.

A basic protection method is to use metal oxide varistor (MOV) devices that consists of a bulk semiconductor material (typically sintered granular zinc oxide). These materials are essentially insulating at low voltages but they can conduct large currents (effectively short-circuits) when presented with a voltage above its rated voltage. MOVs typically limit voltages to about 3 to 4 times the normal circuit voltage by diverting surge current elsewhere than the protected load. MOVs may be connected in parallel to increase current capability and life expectancy, providing they are matched sets.

MOVs are thus commonly installed in devices, such as computers, televisions, and power bars to protect the device or devices they are associated with. Once an MOV conducts electrical current from a surge, the power is converted into heat within the MOV. When the energy dissipated is greater than the capacity of the MOV, thermal disintegration of the MOV occurs. As some point, the MOV's disintegration creates an open circuit, and the equipment is no longer protected from the remainder of the surge and equipment damage can ensue. The surges that MOVs seek to protect are typically not large enough to absorb surge current for a duration that will allow the main circuit breaker to open.

Surge protection devices that are designed to be connected to an electrical panel to protect one or more of its circuits are also known in the art. When such a device is connected to protect a single circuit, it typically includes a fuse so that the circuit is protected by the absorption of the surge current in the MOV followed by the open circuit created by the fuse. When such a device is connected to an electrical panel, the MOVs are typically thermally protected so as to prevent thermal disintegration, possibly leading to a risk of fire. The power that can be absorbed by the surge is limited by the number of each MOVs and their ability to absorb energy until they are thermally overloaded and disconnect. The National Fire Protection Association (NFPA) has documented many cases of catastrophic fires that have been caused by MOV devices in surge suppressors, and has issued bulletins on the issue.

SUMMARY

The present disclosure provides, among others, solutions addressing the above-mentioned problems with the existing systems. This patent application provides complementary improvements to the existing art that may be applied separately or in combination.

Applicant has discovered that a main breaker of an electrical entry panel of a residence or commercial electrical entry can be used to protect the electrical entry from a mains power spike when a MOV surge protector device has the capacity to absorb the power spike until such time as the main breaker can be tripped. Applicant has found that this requires housing of one or more MOVs in a manner that will allow at least one of the MOVs to disintegrate safely under the conditions of absorbing the power spike. In some embodiments, Applicant proposes installing the one or more MOVs in a safety box surrounded with a gas outlet. Encapsulation of the MOVs in an insulating and thermally resistance material has been found to extend the time that the MOV can absorb power before total disintegration occurs resulting in an open circuit.

One exemplarily improvement relates to use of power-pressure technology in surge protectors by, instead of containing the gases resulted by burning of a MOV, allowing exhaust/expansion/extension gases to be safely discharged to a secondary containment which may typically have fire resistance properties. Another improvement, among others, relates to use of material with high dielectric and high heat dissipation capacities to reduce the enthalpy or energy of the gases, and therefore reducing the potential risk of damage and fire that may be caused by these expansion gases.

In one broad aspect, the present disclosure provides a surge protector device comprising an electrical connector for connecting said surge protector device to a current network, at least one metal oxide varistor (MOV) connected to the electrical connector; and a first containment unit at least partially filled with a material having dielectric, heat resistance and elastic properties embedding said at least one MOV unit within said first containment unit, said containment unit having at least one opening, wherein when said at least one MOV unit undergoes thermal disintegration due to a surge in said current network said opening allows expansion gases created by said at least one MOV unit to be discharged from said first containment unit.

It will be appreciated by those skilled in the art that a universal surge protection unit may be made of one or more of surge units as disclosed herein housed in a box and connected to an electrical network.

In some embodiments, the MOV may be embedded in a heat-resistant elastomer within said first containment that absorbs and dissipate heat and energy of said expansion gases allowing reduction of enthalpy of said expansion gases before being discharged. In one embodiment, the heat-resistant elastomer may be a silicone elastomer.

In some embodiments, upon burning of said at least one MOV unit said first containment unit deforms by said expansion gases absorbing mechanical shock created by the gases and reduces enthalpy of said gases.

In some embodiments, the surge protector may further include a second containment unit having fire-resistant properties receiving said expansion gases. In some embodiments, the second containment unit may further comprise fire retardant or fire-resistant material safely absorbing heat and energy of said expansion gas reducing enthalpy of the gas.

In some embodiments, the first containment unit has a half-cylinder form with angles allowing the cancellation of the forces created by pressure and heat of said gases and allowing redirecting said gases to transform their energy to kinetic energy. In one embodiment, the first containment unit may be made of plastic material.

In some embodiments, the electrical connector may be a single-phase AC electrical connector.

It will be appreciated by those skilled in the art that the one phase may be connected to more than one MOVs which may be each in a separate containment unit or all located in the same containment unit.

In one embodiment of the present disclosure the electrical connector may be a three-phase AC electrical connector. And three MOVs are used each connecting to one of the three phases of the AC electrical connector.

It will be appreciated by those skilled in the art that each phase may be connected to multiple MOVs which may have separate containment units or share the same containment unit. Furthermore, it would be appreciated by those skilled in the art that although most electrical wiring codes require one surge unit to be connected to a three-phase AC source, three separate surge units may be implemented by connecting each phase to one surge protector as described herein.

In some embodiments, instead of one containment unit, the surge protector may have three containment units each housing at least one of said at least three MOV units.

In some embodiments, the surge protector may further have a fire-resistant screen placed outside the opening of said first containment unit reducing enthalpy of the expansion gas.

In another broad aspect, the present disclosure provides a surge protector device comprising an electrical connector for connecting said surge protector device to a current network, at least one metal oxide varistor (MOV) connected to the electrical connector; a first containment unit housing said at least one MOV unit having an opening connectable to an electrical panel having fire-resistant properties wherein upon failure of said at least one MOV unit due to a surge in said current network said opening allows expansion gases created by said at least one MOV unit from said first containment unit to the electrical panel.

In one embodiment, the surge protector may also comprise a conduit connecting said opening to a side opening of said electrical panel. It will be appreciated by those skilled in the art that the conduit may have fire resistance properties and may connect the containment unit to directly or indirectly to the electrical board.

It will be appreciated that a main surge protector unit may include multiple surge protector units as described herein within a housing which may be fire-resistant and connect to the electrical board by the conduit as further described herein.

In one embodiment, the MOV may be embedded in a heat-resistant elastomer within said first containment unit allowing reduction of enthalpy of said expansion gases before being discharged. In an example, the heat-resistant elastomer may be a silicone elastomer.

In some embodiments, upon burning of said at least one MOV unit said first containment unit deforms plastically by said expansion gases absorbing mechanical shock created by the gases and reduces enthalpy and/or energy of the gases.

In some embodiments, the conduit may further comprise fire retardant or resistant material absorbing heat and energy of said expansion gas reducing enthalpy of the gas.

In one example, the surge protector may have a fire-resistant screen placed outside said opening of said first containment unit reducing enthalpy of said expansion gas while allowing the expansion of the gases to the outside of the primarily containment unit.

In another broad aspect, the present disclosure provides a method of protecting equipment connected to an electrical entry from a surge voltage spike, the electrical entry having an electrical panel and a main panel breaker disconnecting the electrical panel from power mains in the case of current in excess of a predetermined amperage for a predetermined duration. The method comprises connecting at least one metal oxide varistor (MOV) to the electrical panel, said at least one MOV being able to absorb power from said spike long enough so as to cause said main panel breaker to open, in response to a surge voltage spike appearing at the power mains, allowing the at least one MOV to conduct current from the spike until the at least one MOV undergoes thermal disintegration, containing disintegration gases and particles from said at least one MOV in a housing, discharging cooled disintegration gases from said housing to the ambient, in response to said main panel breaker opening, resetting said main panel breaker to restore power from said electrical entry after said surge voltage spike.

In some examples, the containing may comprise encapsulating said at least one MOV in an insulating and fire-resistant medium.

In some examples, the discharging may comprise discharging said disintegration gases from said housing into said electrical panel.

In some examples, the connecting may comprise connecting said housing to a port of said electrical panel.

BRIEF DESCRIPTION OF THE DRAWINGS

The present examples will be better understood with reference to the appended illustrations which are as follows:

FIG. 14 is a flow diagram illustrating an alternative example of a process involved in handling an electrical power surge.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

Figure 1:
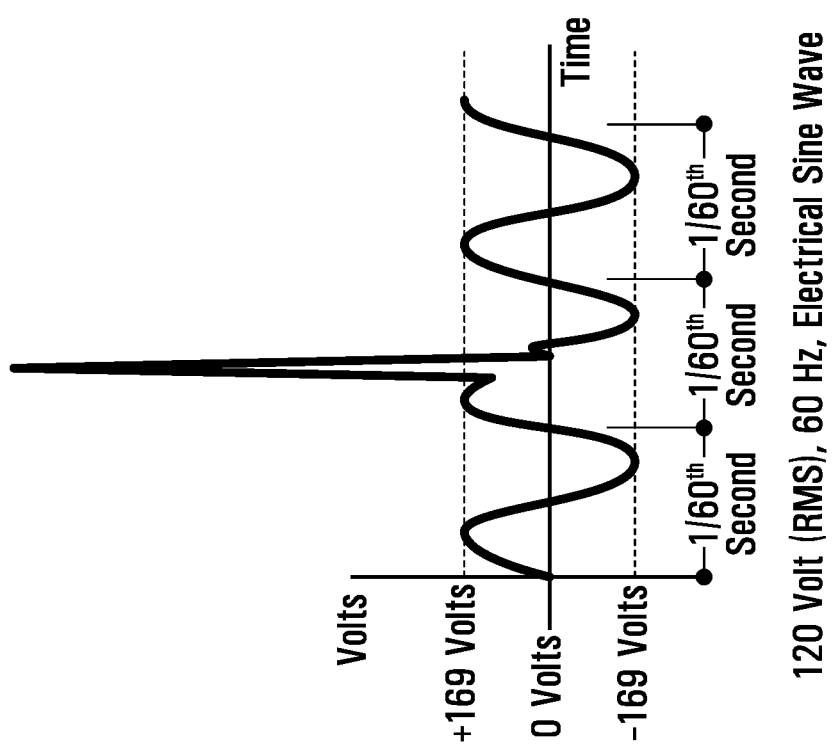
FIG. 1 is a schematic diagram showing voltage changes cause by an electrical surge in an electrical.

Power surge in general is a sudden increase in the level or magnitude from a normal or standard value. In electricity, surge is often used to describe voltage transient, voltage surge or voltage spikes. Voltage surge or spike or transient is not a permanent event. It is occurring only within a short period of time but more than enough to destroy devices if there is no countermeasure. Voltage surge is not only present in power lines but also in circuits with inductive property. However, the voltage surge in the power lines is the most destructive one as it can go as high as few kilovolt ranges. FIG. 1 shows a voltage surge on the AC power line.

Surge protector for AC line transients is installed commonly in houses, offices and buildings to prevent appliances or devices from damage. It should be installed in the section where all devices or appliances get their sources. By doing so, all appliances will be protected by line surges and spikes. This approach is called universal surge protection. Universal surge protector may not be needed if all the appliances or devices have its local surge protection circuit. In some cases, two surge protectors may be used, a primary surge protection device are generally installed in the entry point of house, office or building electrical wiring. It will protect all the devices or appliances which connect the line after the entry point. Secondary surge protector is not as effective and powerful as the primary surge protector. However, it is portable and convenient to use. Mostly, this type of surge protector is easily plugged into the power outlets. It will offer protection only to the devices that derive its power from the power outlet by which the secondary surge protector is installed.

Figure 2:
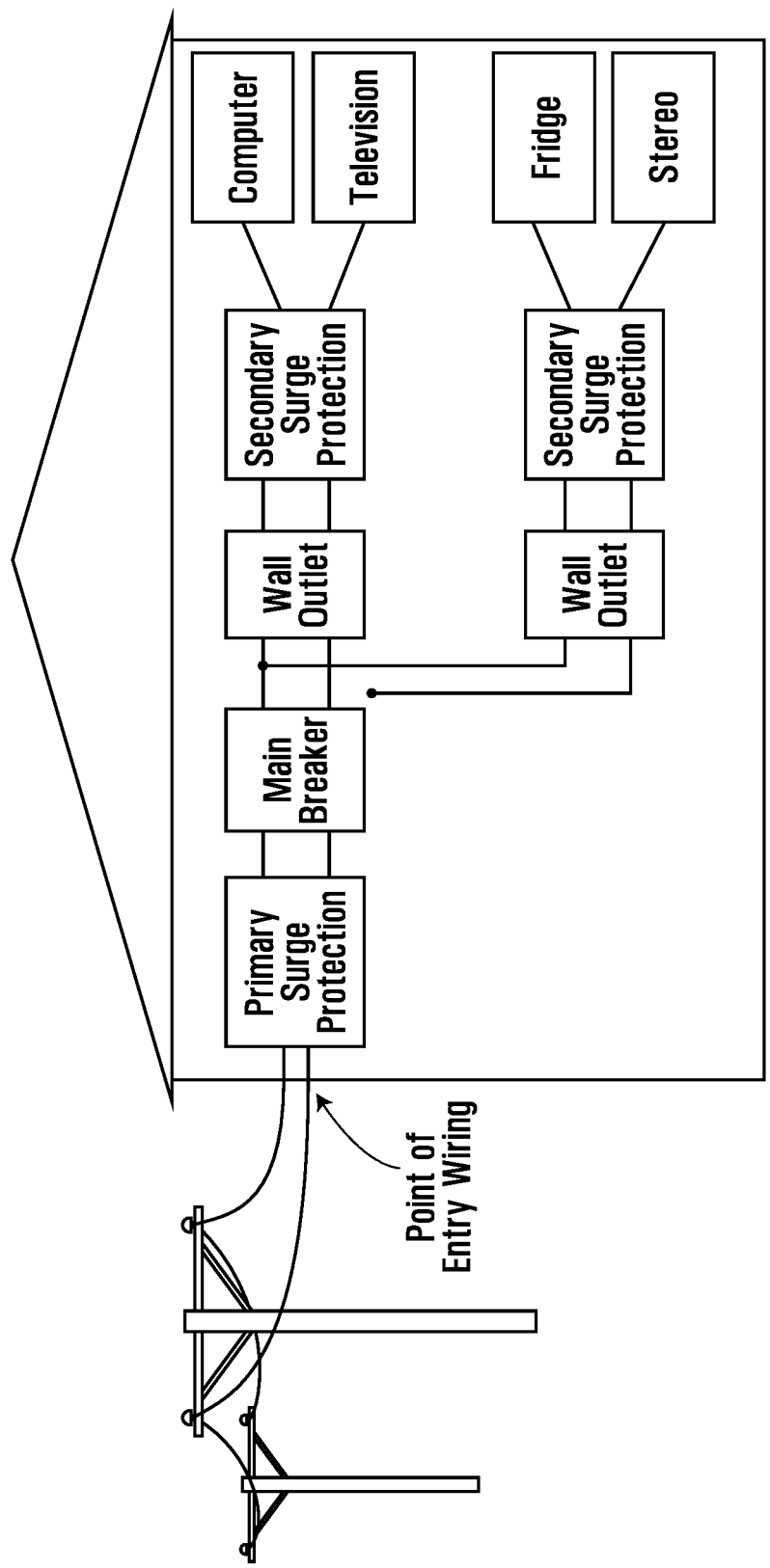
FIG. 2 illustrates a schematic diagram of a typical electrical network having a primarily and a secondary surge protector.

In general, universal surge protection devices and primary surge protectors are very powerful but huge, bulky, expensive and hard to install. Also, upon failing the available devices can have burning gases spread in the surrounding environment which make them a fir hazard requiring compliance with strict regulations. FIG. 2 Illustrates how the primary and secondary surge protectors are installed in a building.

The present disclosure provides a solution to the above-mentioned problems by. Among others, using power-pressure technology which permits the transformation of the extra electrical energy to kinetic energy.

If the voltage from the outlet surges, or spikes, i.e., rises above the accepted level, the surge protector diverts the extra electricity into the outlet's grounding wire.

In the most common type of surge protector, a component called a metal oxide varistor, or MOV, diverts the extra voltage. A typical MOV has three parts: a piece of metal oxide material in the middle, joined to the power and grounding line by two semiconductors.

These semiconductors have a variable resistance that is dependent on voltage. When voltage is below a certain level, the electrons in the semiconductors flow in such a way as to create a very high resistance. When the voltage exceeds that level, the electrons behave differently, creating a much lower resistance. When the voltage is correct, a MOV does nothing. When voltage is too high, a MOV can conduct a lot of current to eliminate the extra voltage. As soon as the extra current is diverted into the MOV and to ground, the voltage in the hot line returns to a normal level, so the MOV's resistance shoots up again. In this way, the MOV only diverts the surge current, while allowing the standard current to continue powering whatever machines are connected to the surge protector. Metaphorically speaking, the MOV acts as a pressure-sensitive valve that only opens when there is too much pressure.

Although, MOVs are designed to suck up short surges that might occur on power lines in case of prolonged surges MOVs break down, usually causing a short circuit. This can lead to heat and possibly fire as shown above. In such cases the MOV may burn by absorbing the electrical energy by a metal oxide varistor (MOV) which can be a fire hazard. The MOV containment typically is charred after a large surge. The existing MOV based surge protector generally designs to contain the gases produced from the burning of the MOV which may have the risk of having gases.

Power-pressure is a technology that allows the transformation of excess electrical energy into safe kinetic energy.

This transformation is based on the reaction of an electronic element following an abnormal overexcitation. This overexcitation is created by an excessive electrical charge or as explained herein a surge in the voltage which is not capable of being supported by a varistor. Power-pressure technology may be used and applied to a surge protector device using MOV or similar technologies. Without this technology, in case of a power surge, the MOV may become a hot, dangerous and unstable. In order to make the element stable, safe and more resistant to heat, the element is encapsulated or embedded in a material such as an inorganic polymer having some of the following characteristics: a high dielectric coefficient, high heat dissipation capacity, very fire-resistant, hardness very specific, a high coefficient of friction and good handling with its curation process. This polymer is itself contained in a potting box or containment unit.

The containment unit or potting box plays a very important role because it will determine the strength of the structure and therefore, it determines the capacity of resistance of the polymer to the increase in temperature, electric arc, explosion and others. The potting box containing the polymer and the electronic elements or MOVs may have very specific characteristics, including one or more of high dielectric coefficient, high capacity to dissipate heat, high fire resistance, high capacity to withstand mechanical impacts, elongation/memory, cutting capacity its molecular chains to improve its adhesion to the polymer. The potting box may have a very specific geometric shape: different angles are used for the cancellation of the forces created by the pressure caused by heat and for the redirection of the remaining energy towards kinetic energy. As a result: we have a mass (compact mass and some particles) directed towards a controlled path. The Power-pressure system is supplemented at the security level by a unidirectional sealing at the exit of the main box.

Figure 3:
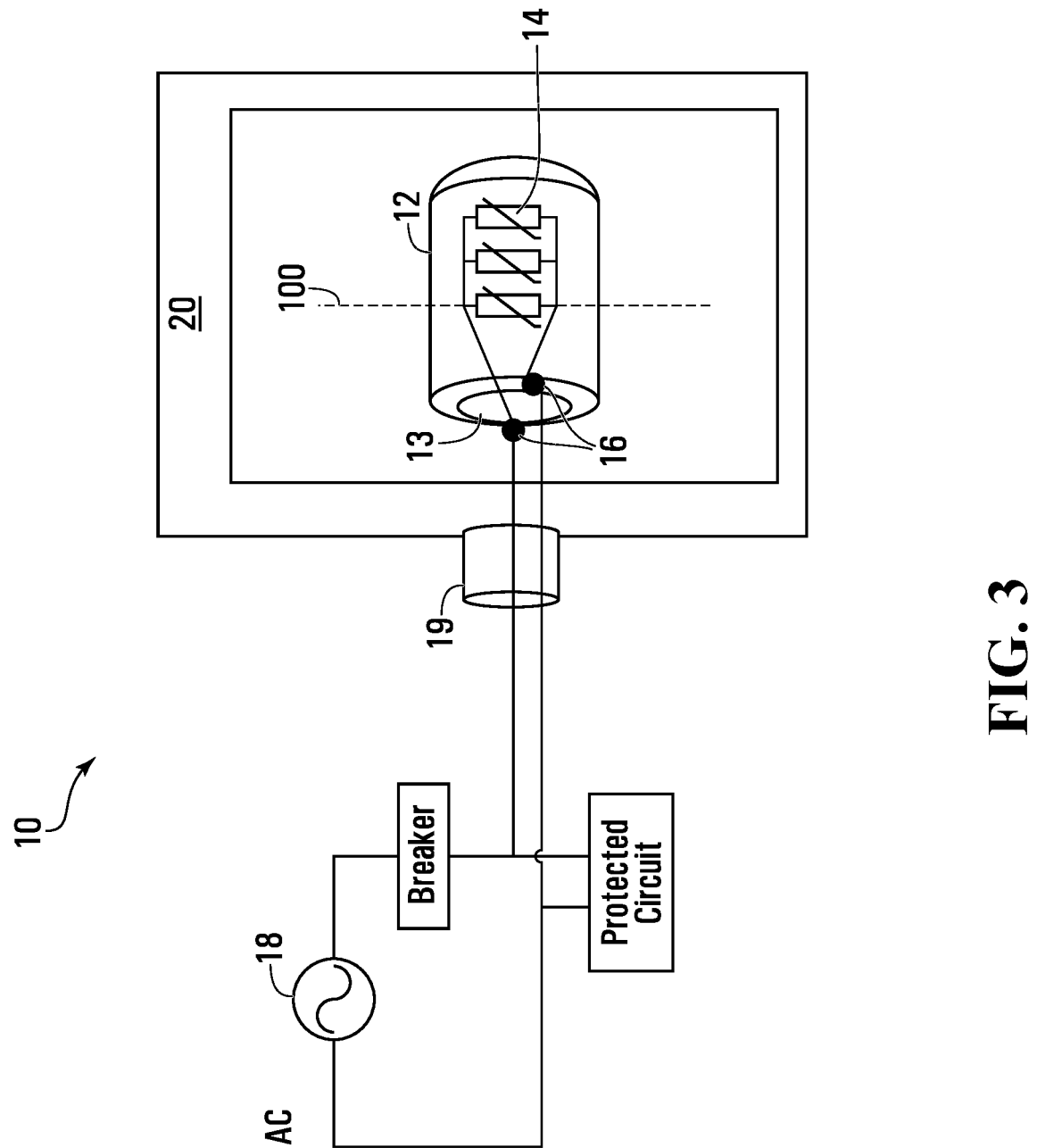
FIG. 3 illustrates a schematic cross-sectional view of a surge protector with multiple MOVs arranged in a first containment unit or box in accordance to one embodiment of the present disclosure.

The present disclosure provides a surge protector device that benefits from power pressure technology allowing the excessive electrical energy which burns the MOV to be transformed to kinetic energy. As illustrated in FIG. 3, a single-phase surge protector 10 may have an MOV unit 14 that is embedded in a dielectric, heat resistant and elastic material or containment medium 22 (shown in FIG. 5) within a containment unit or potting box 12. The MOV unit 14 can absorb the surge until a breaker trips or the surge terminates, thus protecting a protected circuit.

Figure 4:
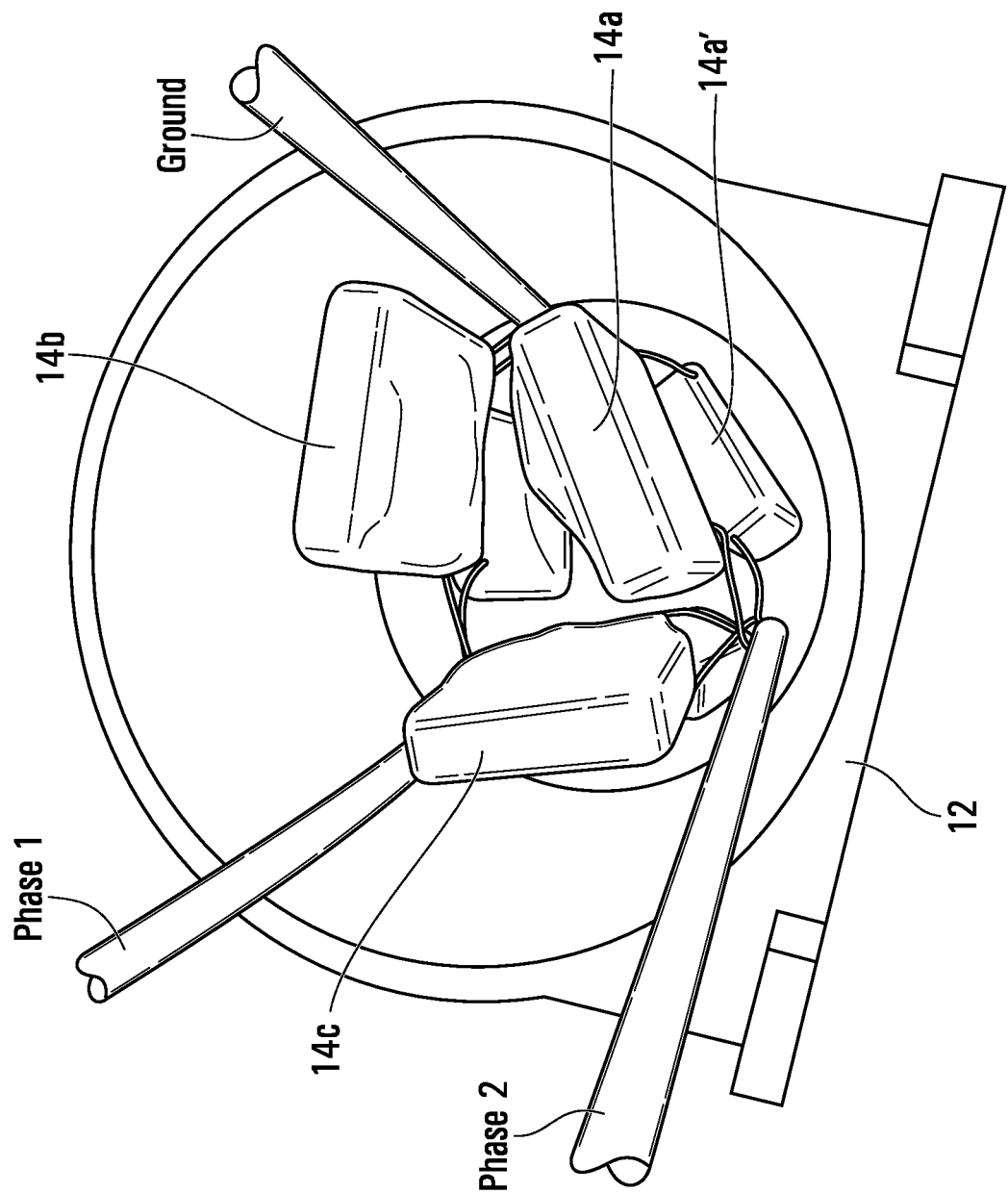
FIG. 4 illustrates how six MOVs connected to three wires (ground, phase 1 and phase 2) in a container prior to filling.

FIG. 4 illustrates an exemplary arrangement of six MOVs 14 connected to three wires in a container 12. For example, two MOVs 14a and 14a' are connected in parallel between a ground wire and a phase wire. The container 12 is shown before filling with a filler that will surround the MOVs 14 and their wires.

Figure 11A:
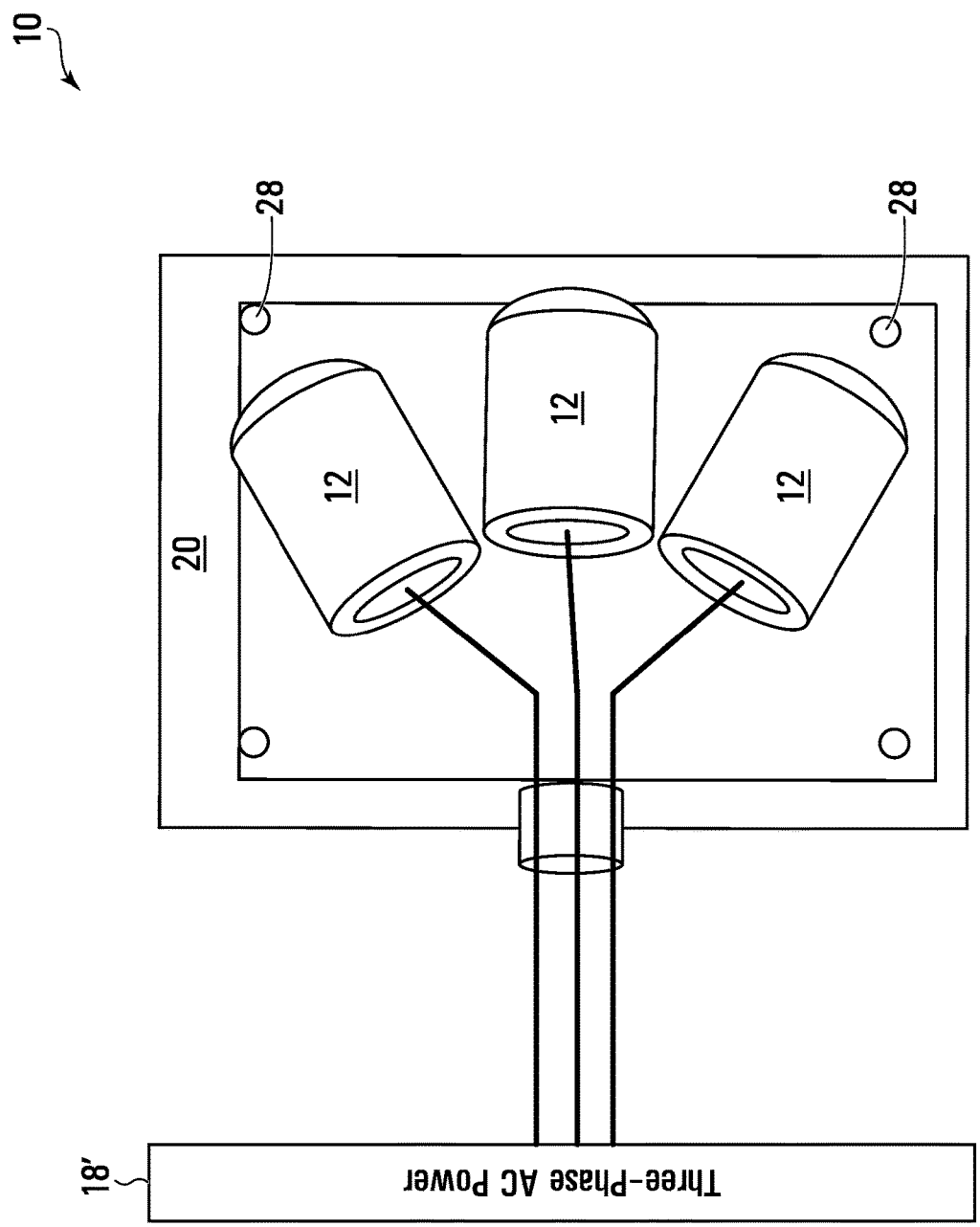
FIG. 11A illustrates a schematic view of surge protector connect to an AC three-phase current source in accordance with one embodiment of the present disclosure.
Figure 11B:
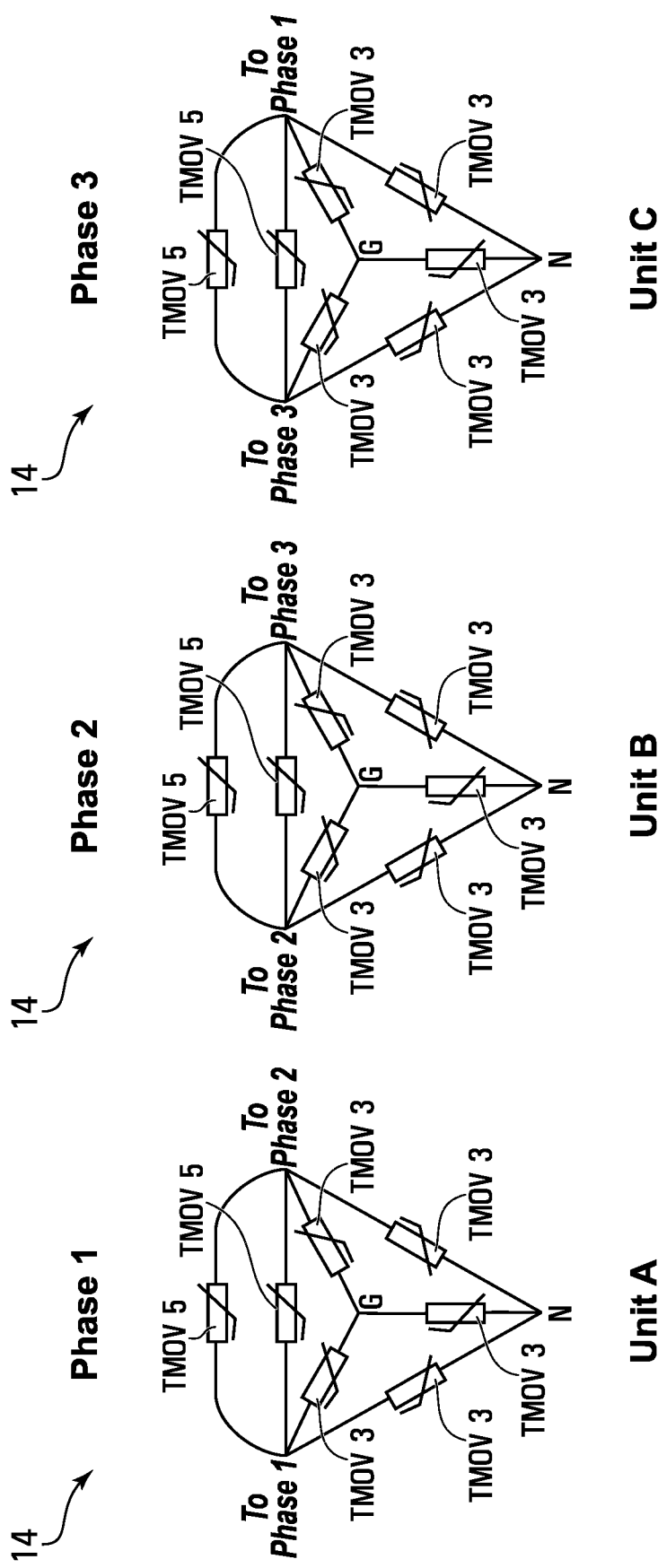
FIGS. 11B and C illustrate the schematic view of different MOV units used for different embodiments of the present disclosure used for three-phase surge protection in accordance with one embodiment of the present disclosure.

As illustrated in FIG. 11B, the MOV 14 may include a number of TMOVs 11 which may be formed in a triangular shape. It will be appreciated by those skilled in the art that although one leg of the triangle has been shown to have two TMOVs, but any link may have one or more TMOV elements. Furthermore, it will be appreciated by people who have skills in this field that any other type of Mov element such as iTMOVs or other types of MOVs known in the art can be alternatively used in different embodiments of the present disclosure.

As illustrated different types of TMOVs may be used in different combinations. Some example so of the TMOVs are TMOV 1=TMOV25SP130E/TMOV 2=TMOV25SP275E/ TMOV 3=TMOV25SP320/ETMOV 5=TMOV25SP550E/ TMOV 4=TMOV25SP385E/TMOV 6=TMOV25SP750E.

As illustrated any number such as four, six, seven of these TMOVs or other type of MOVs may be arranged between positive-ground, positive-negative and positive-negative-ground connection depending on the design of the surge protector.

As shown in some embodiments, TMOV1 and TMOV may be used for non-three-phase surge protectors.

Their strength and type of the MOV used may depend on the voltage to which the surge protector will be connected. In some embodiments, it is important to respect the particular shape of the MOV 14 (curved on one side, flat on the other). In one example of the surge charger, the flat part of the MOV 14 may face outward, parallel to the walls of the potting box, because this is typically where the explosion of the MOV may occur.

In this embodiment, the position of the MOV 14 may allow the pressure to rebound against the walls of the containment unit 12 which will then redirect it towards the opening 13 and outside of the containment unit 12.

In some examples of the present disclosure, a layer of epoxy such as 1340 epoxy may be put on the MOV which may increase the tolerance of the MOV at the time of the explosion.

The medium 22 used for embedding the MOV 14 may be any medium known in the art having such properties such as heat-resistant elastomer like silicone, sand or even helium.

In one example, black silicone may be used as the embedding medium 22. in this example, black silicone is poured into containment unit 12 embedding the MOV 14 assembly inside the containment 12. In different embodiments other mediums having high dielectric coefficient which provides electrical insulation, high heat dissipation properties, and sufficient hardness in range of 50-55

Figure 5:
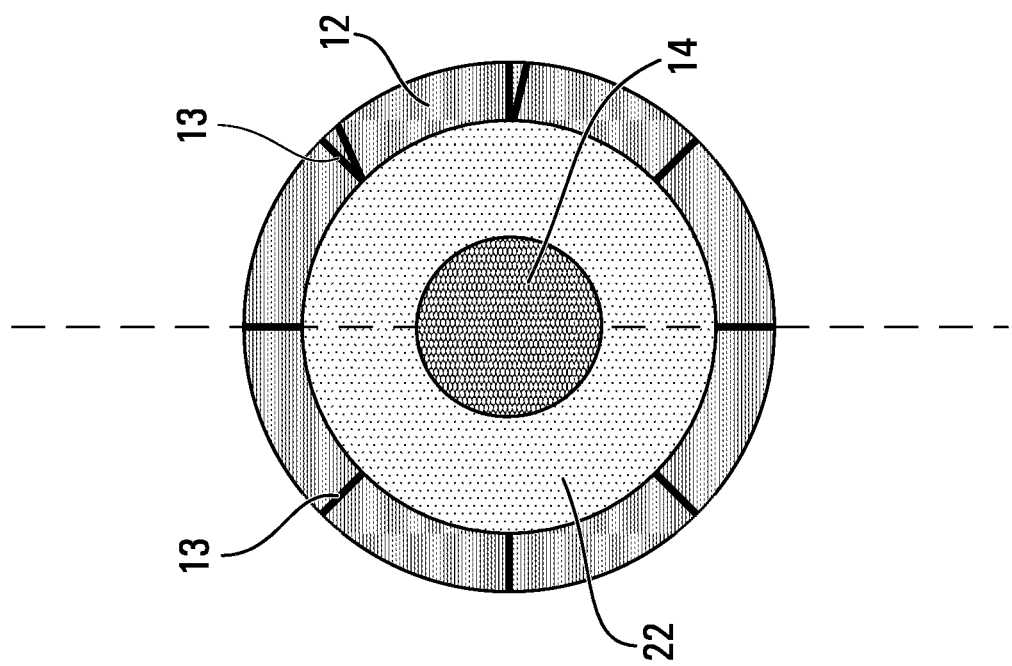
FIG. 5 illustrates a schematic cross-sectional view of a containment unit across line 100 having a containment medium or material around the MOVs in accordance with one embodiment of the present disclosure.

Now referring to FIG. 5, a cross-sectional view of containment unit 12 has been illustrated along the line 100 (shown in FIG. 3). The MOV unit 14 is embedded in the medium 22.

In some embodiments, the medium 22 used such as silicone may also serve in holding the MOV in its place within containment 12. In some other embodiments, for example when helium is used as the dielectric, heat resistant and elastic medium, an additional mechanism such as one or more simple links or any other simple mechanical mechanism (not shown here) may be used to hold the MOV unit 14 within the containment unit 12. It will be appreciated that such connectors have to be dielectric and heat resistant.

An AC current source or network 18 (single phase shown in this drawing) may be typically connected to the surge protector 10 through electrical connections 16. It will be appreciated by those skilled in the art that while in the drawing the wires extended within the surge protector 10 housing 20 or internal wiring of the surge protector may connect to the AC source outside the surge protector 10 at a conduit 19. The conduit 19 can be filled with a heat resistant or firestop material and have holes for allowing wires to pass through the filled conduit. When the filler material is elastic, a seal can be formed isolating housing 20 while allowing for gas under pressure to escape through the holes in the filled conduit 19. Other gas escape ports can be used if desired.

In some embodiments, upon burning of the MOV unit 14 extension or burning gases may be created with high temperature and enthalpy the gases and products of the burning then can expand outside the containment unit 12 through the opening 13. In one embodiment, a part of the energy created by the burning of the MOV unit may be absorbed by the dielectric, heat resistant and elastic medium 22 which may expand outside the containment unit 12 through opening 13.

It will be appreciated by those skilled in the at that the containment unit may have more than one opening and they may all be located at one side the containment unit or be spread on different parts of the containment 12.

In some embodiments, there may be preferable to direct all the expansion gases in one or more specific direction, therefore the design of the containment box may be different to accommodate this need. For example, if one specific direction is preferred, the containment unit may have one or multiple opening in that specific direction. It will be appreciated that any design choice regarding the number and the position of position of the openings may be implemented to achieve this goal.

In one example, the containment unit may have a cylindrical or partially cylindrical form which may help directing the expansion gases and/or the martial embedding the MOV a desired direction to be discharged or exhausted accordingly.

Figure 7:
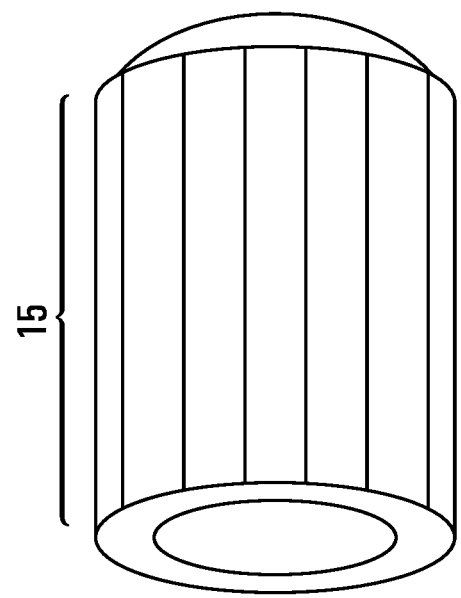
FIGS. 6 and 7 illustrate a schematic view of a containment unit having grooves allowing the better deformation.
Figure 6:
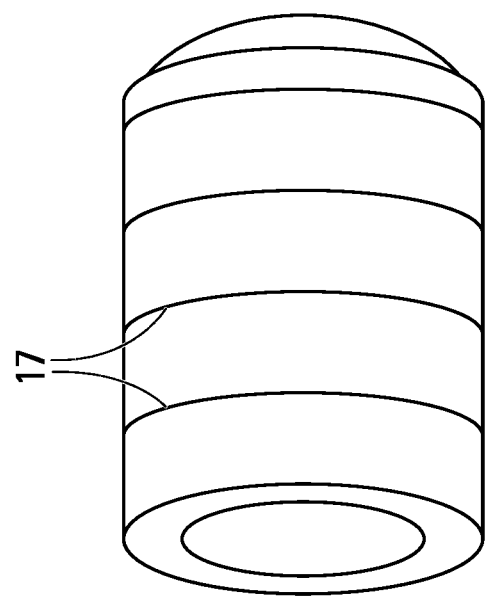

In some examples, as illustrated in FIGS. 6 and 7 the containment unit 12 may have one or more groove 13 which may provide the containment unit ability to better elastically expand by the expansion gases and prevent the cracking of the containment unit 12. The grooves may extend along a length 15 of containment unit 12 or around the circular circumference 17 of the containment unit 12. It will be appreciated by those skilled in the art that the grooves may have spiral or any other form to improve the expansion property of the containment unit 12. It will be appreciated by those skilled in the art that grooves are implemented in a manner that they do not create weak point within the structure of the containment unit and do not cause fracture of the containment unit.

In one embodiment, the medium used for making the containment unit 12 may provide the plastic property required without using the grooves or other design patterns. In one example, the containment unit 12 may be made of any medium showing elastic properties under sudden pressure and or higher temperatures while showing good heat resistance properties. In one embodiment, the medium is fire resistant.

It will be appreciated that any other medium that can deform and/or is not brittle when exposed to sudden pressure caused by the expansion gases may be used for making of the containment unit 12. The medium 22 may need to be fire resistance and dielectric.

In one preferred embodiment, the potting box or containment unit 12 may be made of medium that is not too hard in order to prevent it from bursting at a certain pressure level. The case must be able to deform under pressure and then regain its original shape. Also, it may be preferable that the unit 12 have dielectric property as it may be in contact with silicone. In one example, heat dissipation property of containment unit may further increase the cooling effect on the expansion gases.

Figure 8:
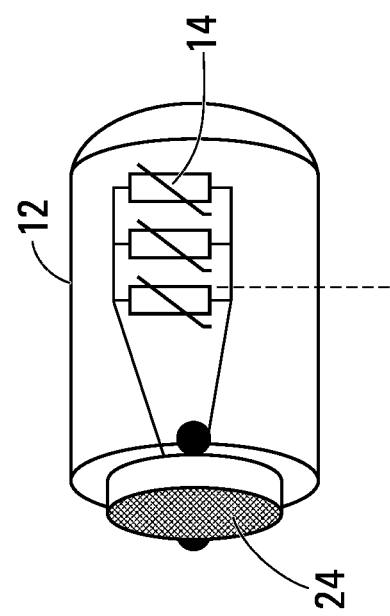
FIG. 8 illustrates the schematic view of a containment unit having a screen, filter, fire stop in accordance with one embodiment of the present disclosure.

Referring now to FIG. 8, the containment unit 12 may also have a screen, filter, fire stop or mesh 24 with fire-resistant and fire-retardant properties. The screen 24 may also absorb the heat and energy of the gases while allowing expansion of the gases into housing 20.

In one embodiment, the screen 24 may provide pressure relief without letting debris pass. In one example a thickness of 1 cm of fire stop may be put on the opening 13 of the containment unit 12. The screen or fire stop 24 typically allows excess pressure to pass without debris or flame and without the risk of causing the containment unit 12 to explode. In one embodiment, it may be preferable that the opening of the potting box 12 is centered towards the exit. The device as a whole allows you to control what will come out of the containment unit and how.

It will be appreciated by those skilled in art that housing 20 may work a secondary containment unit safely receiving the hot gases and the expanded embedding medium (silicone, nitrogen, helium, etc.). The housing 20 may be completely or partially filled by fire-resistant and heat absorbent martial reducing the energy and the enthalpy of the expansion gases. Although the screen has been shown to have a small thickness extending from the opening 13, in some embodiments, the screen may extend inwardly or outwardly from the opening 13 for a desired length.

In some embodiments, the secondary containment unit may connect directly or via a conduit to the containment unit 12 and receive the expansion gases. This embodiment can have the housing 20 or may function without the housing 20.

Figure 9:
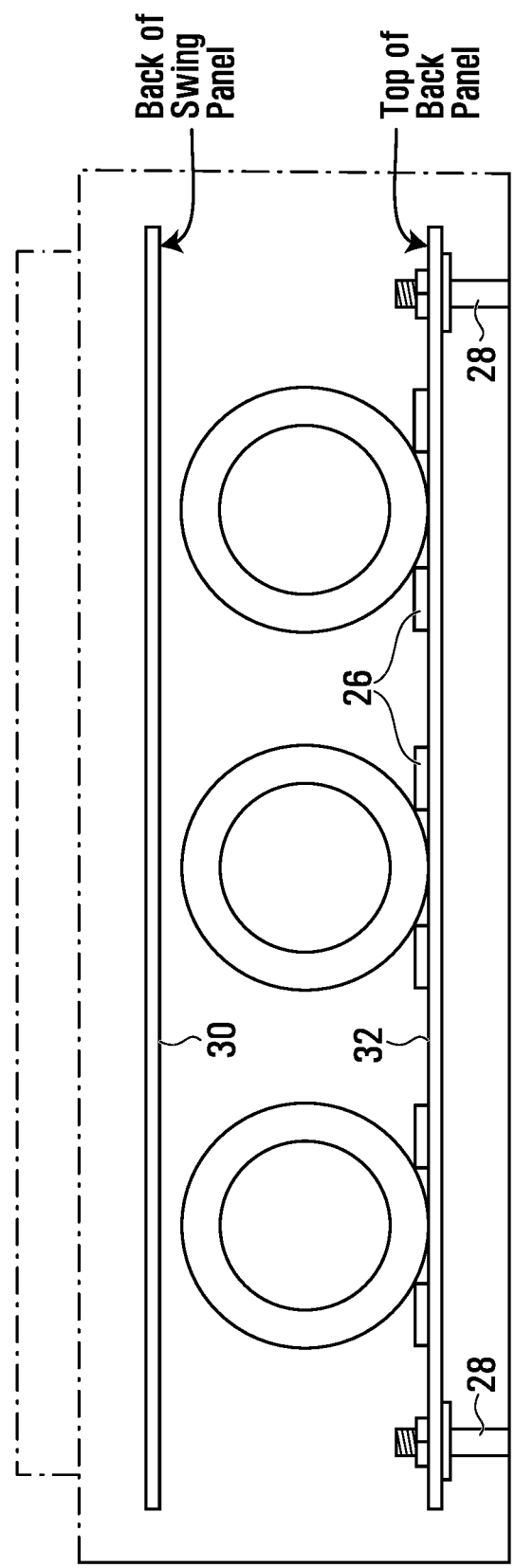
FIG. 9 illustrates a cross-sectional view of a surge protector having three containment unit installed on a back panel in accordance with one embodiment of the present disclosure.

In some embodiments, the housing 20 may have a back panel 32 that may have one or more connectors 26 for connecting and fixing one or more containment units 12 as well as a back-swing panel 30. As illustrated in FIG. 9, the back panel 32 may be fixed to the housing 20 by connection means 28 that may be any type of bolt including elevator bolt, carriage bolt and nuts. In one embodiment, the connection means 28 may have dielectric and/or heat resistance properties.

In one example, the ferrules used may be resistant to high temperatures to prevent the connections from melting. The electrical wires may need to be fire-resistant and comply with required standard for example the UL 94V0 standard because they must be extinguished alone in contact with the flames.

Figure 10:
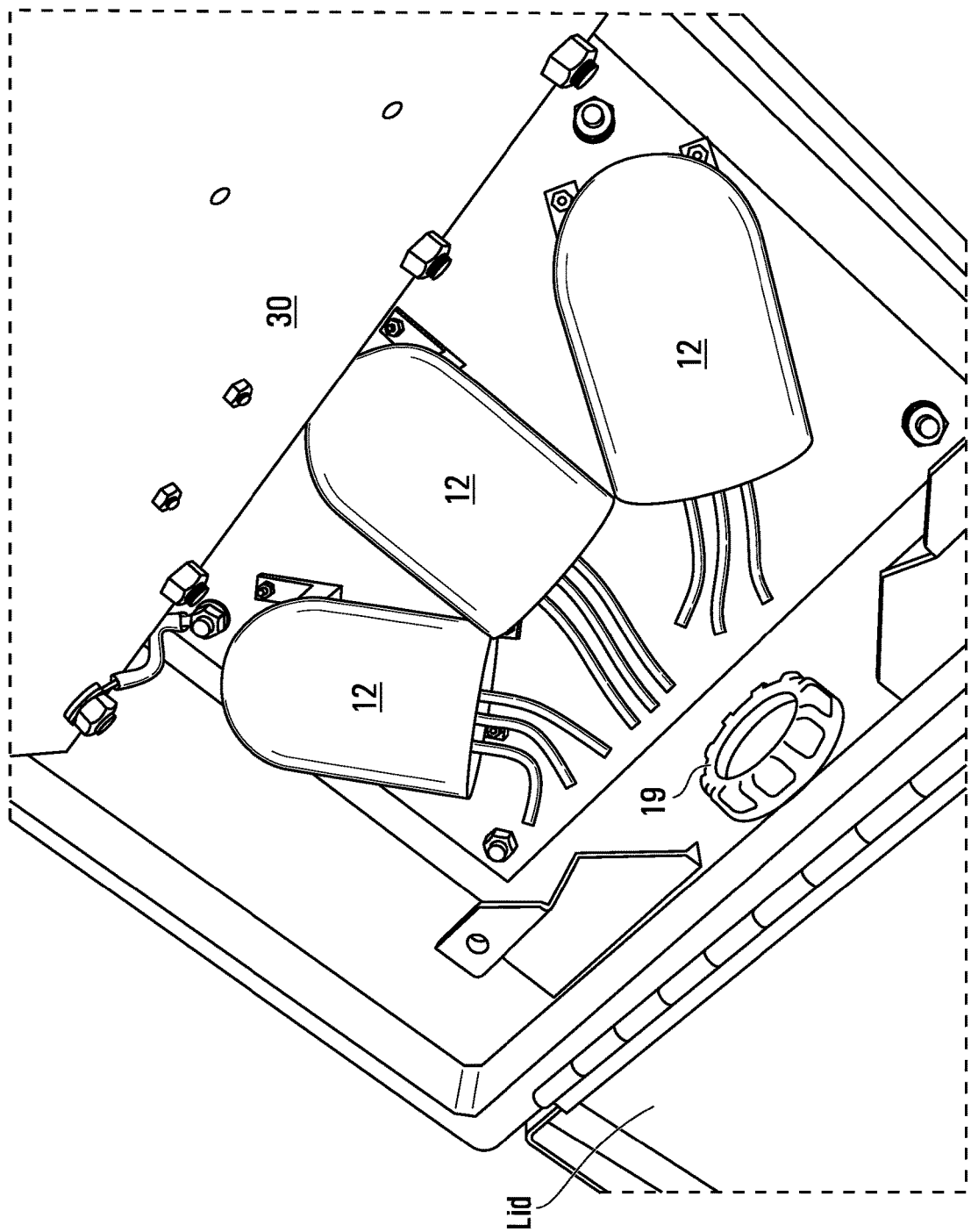
FIG. 10 illustrates some design details of the surge protector in accordance with an embodiment having three units containing MOVs.

FIG. 10 illustrates some design details of the surge protector 10 in accordance with an embodiment having three units 12 containing MOVs 14. The housing illustrated has a metal enclosure with a conduit or port 19 providing the electrical connection. The back-swing panel 30 folds down to cover the units 12 and then the lid swings down to cover the panel 30. While not illustrated, the power cables fed through port 19 can connect directly to the wires of the units 12 or they can pass through a port in panel 30 to terminals for connection to the wires of each unit 12.

In some instances, the surge protector 10 may work with a three-phase AC power source 18' having each of three phases connected to one MOV device 14 within the housing 20. It will be appreciated that each containment unit may have any of the details of other embodiments as described herein such as screen 24 which are not illustrated in this drawing.

In some alternative embodiment, three surge protectors 10 may be used, each connecting to one of the phases of the three-phase AC power source. However, some safety standard codes do not allow such settings.

This embodiment with three separate MOV modules, as shown in FIG. 11A, has the same manufacturing rules as for the other embodiment.

Figure 11C:
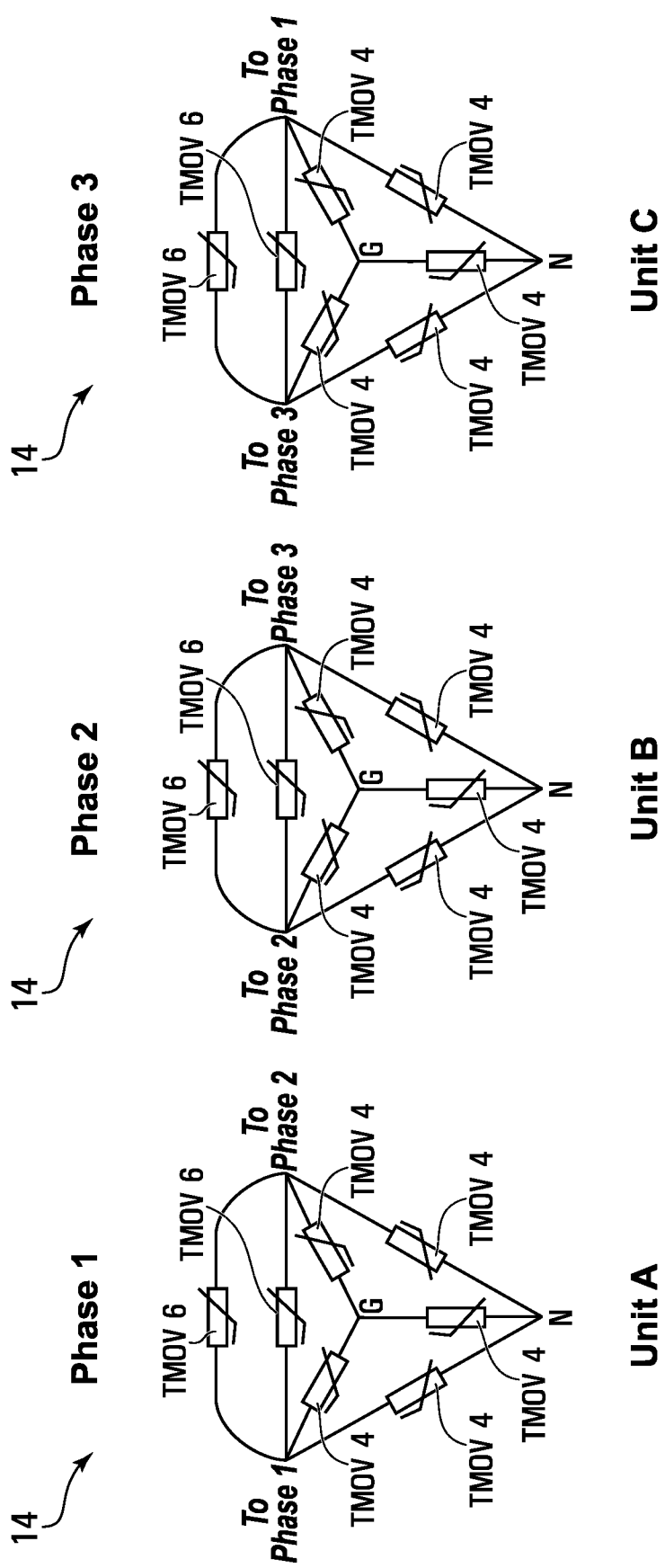

FIGS. 11B and 11C illustrates two combination of MOVs may be used for three-phase current. As shown, the MOV 14 of each surge protectors 12 may have a number of TMOVs, or other type of MOVs, and may be arranged between two of the three phases of the three-phase power source 18', ground connection and negative connection.

As shown different arrangement of TMOVs or MOV elements 11 may be arranged in a triangular arrangement similar to what was described for non-three phase designs.

As illustrated in 11B and 11C, in some embodiments, the MOVs used depending on the connections may be TMOV3 and 5. In some other examples TMOV4 and TMOV 6 may be used alternatively.

In one example, the fire stop or screen 24 may be placed directly on the silicone medium 22 at the opening of the potting box/containment unit 12, forming a ring to help reduce the excessive pressure exiting the contours of the potting box. In this embodiment, there may be no fire stop or screen 24 at the opening because the closing would be too strong and prevent the release of pressure. In this embodiment, the three units may be in a sandwiched format in the center of the housing 22 between the bottom panel 32 and a swing panel 30 to allow directing and controlling the pressure which would otherwise rebound and break the cover.

In general, the MOVs 14 when embedded in an elastomeric material will disintegrate while discharging gas and particulates with the gases escaping along the wall of container 12. In the case of container open on one side, such as the half cylinder shaped container illustrated in the Figures, will result in the gases and particulates seeking an exit at a point along the sidewall. By filling the container less than full with the elastomeric material and placing firestop material around the inside edge of such an opening, and causing the gases and particulates to be deviated around the firestop material, fewer burning particulates are released with the gases from the container 12.

Figure 12:
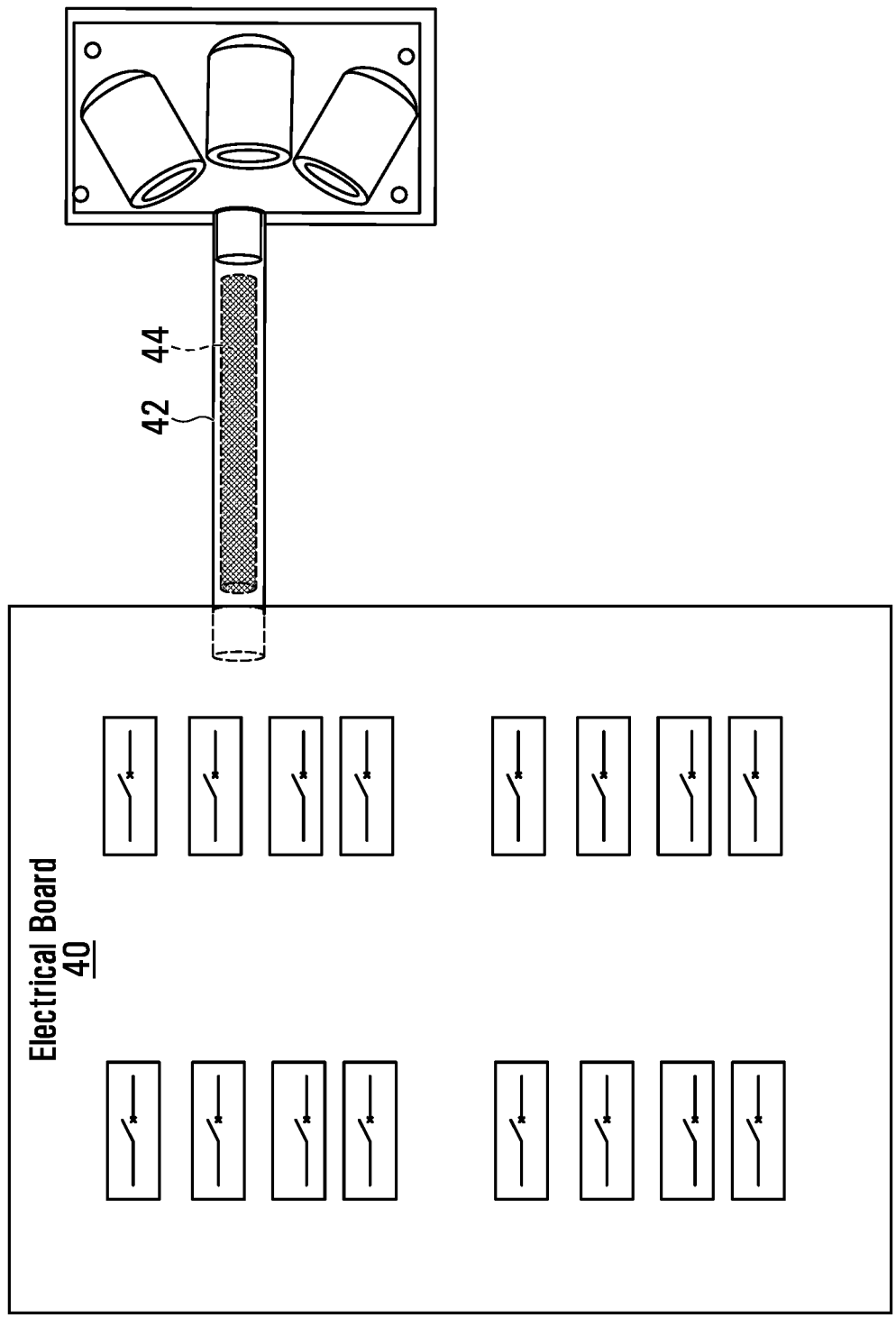
FIG. 12 illustrates a schematic view of surge protector having three containments units connect to an electrical board by a conduit in accordance with one embodiment of the present disclosure.

Now referring to FIG. 12 that shows embodiments, single phase and three phases, of the present disclosure having the expansion gases transferred to the electrical box 40 which is typically fire-resistant and resistance and have enough space to contain the expansion gases. As illustrated a conduit 42 may be used for connecting the surge protector 10 to the electrical panel 40 but in some examples, the surge protector can also directly connect to the electrical board 40.

In one example, any type of fireproof medium 44 may be used in the conduit or within the housing 20 of the surge protector 10 to reduce the enthalpy, heat and energy of the expansion gases before being discharged into the electrical board.

Figure 13:
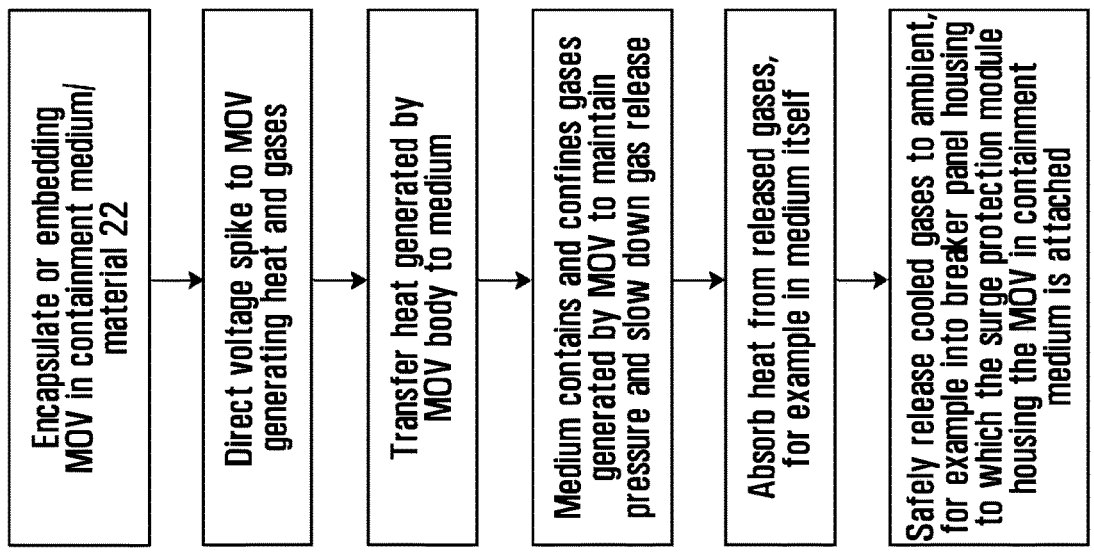
FIG. 13 is a flow diagram illustrating one embodiment of a process involved in handling an electrical power surge.

FIG. 13 illustrates the steps involved in use of a surge protector in one embodiment of the present disclosure. Primarily the MOV may be encapsulated or embedded in a containment medium or material 22. Then when a surge happens the voltage spike may be directed to MOV which in turn generates heat and gases.

The heat and gases created by the MOV unit may be transferred by MOV body to medium. The medium may contain, and confines gases generated by MOV to maintain pressure and slow down gas release and the heat from released gases may be absorbed by the medium before being released safely, cooled gases, to ambient for example into breaker panel housing to which the surge protection module housing the MOV in containment medium is attached.

In one example, fire stop or screen 24 may also reduce the temperature of the gases and allow them to be released into the secondary containment unit or the electrical panel.

FIG. 14 shows an alternative method of protecting equipment connected to an electrical entry from a surge voltage spike. In this method the electrical entry having an electrical panel and a main panel breaker disconnecting the electrical panel from power mains in the case of current in excess of a predetermined amperage for a predetermined duration. The method comprises connecting one or more metal oxide varistor (MOVs), to the electrical panel. The MOV may be able to absorb power from the spike long enough so as to cause said main panel breaker to open. In response to a surge voltage spike appearing at the power mains, allowing the MOV or MOVs to conduct current from the spike until the at least one MOV undergoes thermal disintegration. Containing disintegration gases and particles from said at least one MOV in a housing and discharging cooled disintegration gases from said housing to the ambient. In the next step, in response to said main panel breaker opening, resetting said main panel breaker to restore power from said electrical entry after said surge voltage spike.

What is claimed is:

1. A surge protector device comprising:
    an electrical connector for connecting said surge protector device to a current network;
    at least one metal oxide varistor (MOV) connected to said electrical connector; and
    a first containment unit at least partially filled with a containment medium having dielectric, heat resistance and elastic properties embedding said at least one MOV unit within said first containment unit, said containment unit having at least one opening;
wherein when said at least one MOV unit undergoes thermal disintegration due to a surge in said current network said opening allows expansion gases created by said at least one MOV unit to be discharged from said first containment unit.

2. The surge protector device as defined in claim 1, wherein said medium is a heat-resistant elastomer within said first containment that absorbs and dissipate heat and energy of said expansion gases allowing reduction of enthalpy of said expansion gases before being discharged.

3. The surge protector device as defined in claim 2, wherein said heat resistant elastomer is a silicone elastomer.

4. The surge protector device as defined in claim 1, wherein upon burning of said at least one MOV unit said first containment unit deforms by said expansion gases absorbing mechanical shock created by the gases and reduces enthalpy of said gases.

5. The surge protector device as defined in claim 1, further comprising a second containment unit having fire-resistant properties receiving said expansion gases.

6. The surge protector device as defined in claim 5, wherein said second containment unit further comprises fire retardant resistant material safely absorbing heat and energy of said expansion gas reducing enthalpy of the gas.

7. The surge protector device as defined in claim 1, wherein said first containment unit has a half-cylinder form with angles allowing the cancellation of the forces created by pressure and heat of said gases and allowing redirecting said gases to transform their energy to kinetic energy.

8. The surge protector device as defined in claim 1, wherein said first containment unit is made of plastic material.

9. The surge protector device as defined in claim 1, wherein said electrical connector is a single-phase AC electrical connector.

10. The surge protector device as defined in claim 1, wherein said electrical connector is a three-phase AC electrical connector and wherein said at least one metal oxide varistor (MOV) connected is at least three MOV units each connected to one phase of said three-phase AC electrical connector.

11. The surge protector device as defined in claim 10, wherein said first containment unit is at least three containment units each housing at least one of said at least three MOV units.

12. The surge protector device as defined in claim 1, further comprising a fire-resistant screen placed outside said opening of said first containment unit reducing enthalpy of said expansion gas.

13. A surge protector device comprising:
   an electrical connector for connecting said surge protector device to a current network;
   at least one metal oxide varistor (MOV) connected to said electrical connector; and
   a first containment unit at least partially filled with a containment medium having dielectric, heat resistance and elastic properties embedding said at least one MOV unit within said first containment unit, said containment unit having an opening connectable to an electrical panel having fire resistance properties;
wherein upon failure of said at least one MOV unit due to a surge in said current network said opening allows expansion gases created by said at least one MOV unit from said first containment unit to said electrical panel.

14. The surge protector device as defined in claim 13, further comprising a conduit connecting said opening to a side opening of said electrical panel.

15. The surge protector device as defined in claim 14, wherein said conduit further comprises fire-retardant resistant medium absorbing heat and energy of said expansion gas reducing enthalpy of the gas.

16. The surge protector device as defined in claim 13, wherein said MOV is embedded in a heat-resistant elastomer within said first containment unit allowing reduction of enthalpy of said expansion gases before being discharged.

17. The surge protector device as defined in claim 13, wherein upon burning of said at least one MOV unit said first containment unit deforms plastically by said expansion gases absorbing mechanical shock created by the gases and reduces enthalpy of said gases.

18. The surge protector device as defined in claim 13, wherein said heat resistant elastomer is a silicone elastomer.

19. The surge protector device as defined in claim 13, further comprising a fire-resistant screen placed outside said opening of said first containment unit reducing enthalpy of said expansion gas.

20. A method of protecting equipment connected to an electrical entry from a surge voltage spike, the electrical entry having an electrical panel and a main panel breaker disconnecting the electrical panel from power mains in the case of current in excess of a predetermined amperage for a predetermined duration, the method comprising:
   connecting at least one metal oxide varistor (MOV) to the electrical panel, said at least one MOV being able to absorb power from said spike long enough so as to cause said main panel breaker to open;
   in response to a surge voltage spike appearing at the power mains, allowing the at least one MOV to conduct current from the spike until the at least one MOV undergoes thermal disintegration;
   containing disintegration gases and particles from said at least one MOV in a housing;
   discharging cooled disintegration gases from said housing to the ambient;
   in response to said main panel breaker opening, resetting said main panel breaker to restore power from said electrical entry after said surge voltage spike.

* * * * *